US006956208B2

(12) United States Patent
Reilly et al.

(10) Patent No.: US 6,956,208 B2
(45) Date of Patent: Oct. 18, 2005

(54) METHOD AND APPARATUS FOR CONTROLLING POSITION OF A LASER OF A MALDI MASS SPECTROMETER

(75) Inventors: James P. Reilly, Bloomington, IN (US); Kirk S. Boraas, Bloomington, IN (US); Noah P. Christian, Bloomington, IN (US)

(73) Assignee: Indiana University Research and Technology Corporation, Indianapolis, IN (US)

( * ) Notice: Subject to any disclaimer, the term of this patent is extended or adjusted under 35 U.S.C. 154(b) by 0 days.

(21) Appl. No.: 10/603,488

(22) Filed: Jun. 25, 2003

(65) Prior Publication Data

US 2004/0183006 A1 Sep. 23, 2004

Related U.S. Application Data

(60) Provisional application No. 60/455,505, filed on Mar. 17, 2003, and provisional application No. 60/455,714, filed on Mar. 17, 2003.

(51) Int. Cl.$^{7}$ .............................................. H01S 49/00
(52) U.S. Cl. ........................ 250/288; 250/282; 250/281
(58) Field of Search .......................... 250/288, 289–300

(56) References Cited

U.S. PATENT DOCUMENTS

| | | | | |
|---|---|---|---|---|
| 4,740,298 | A | | 4/1988 | Andresen et al. |
| 4,803,355 | A | | 2/1989 | Takahashi |
| 4,867,947 | A | | 9/1989 | Andresen et al. |
| 5,037,611 | A | | 8/1991 | Ledford, Jr. |
| 5,372,862 | A | | 12/1994 | Krishnaswamy |
| 5,572,025 | A | | 11/1996 | Cotter et al. |
| 5,612,887 | A | | 3/1997 | Laube et al. |
| 5,624,722 | A | | 4/1997 | Nagaishi et al. |
| 5,696,376 | A | | 12/1997 | Doroshenko et al. |
| 5,763,875 | A | | 6/1998 | Kaesdorf et al. |
| 5,841,136 | A | | 11/1998 | Holle et al. |
| 5,917,185 | A | | 6/1999 | Yeung et al. |
| 5,965,884 | A | | 10/1999 | Laiko et al. |
| 6,086,366 | A | | 7/2000 | Mueller et al. |
| 6,175,112 | B1 | | 1/2001 | Karger et al. |
| 6,278,794 | B1 | | 8/2001 | Parekh et al. |
| 6,282,213 | B1 | | 8/2001 | Gutin et al. |
| 6,348,688 | B1 | | 2/2002 | Vestal |
| 6,414,306 | B1 | | 7/2002 | Mayer-Posner et al. |
| 6,444,980 | B1 | | 9/2002 | Kawato et al. |
| 6,558,902 | B1 | | 5/2003 | Hillenkamp |
| 6,707,039 | B1 | * | 3/2004 | Truche et al. ............... 250/288 |
| 2001/0033809 | A1 | | 10/2001 | Karger et al. |
| 2002/0066857 | A1 | | 6/2002 | Hughey et al. |
| 2002/0120404 | A1 | * | 8/2002 | Parker ......................... 702/19 |
| 2002/0148972 | A1 | | 10/2002 | Krutchinsky et al. |
| 2004/0021071 | A1 | * | 2/2004 | Mordekhay ................. 250/288 |
| 2004/0023410 | A1 | | 2/2004 | Stacey |

OTHER PUBLICATIONS

PCT Search Report for PCT International Patent Application No. PCT/US04/06822, Mar. 16, 2005, 8 pages.

* cited by examiner

*Primary Examiner*—John R. Lee
*Assistant Examiner*—Zia R. Hashmi
(74) *Attorney, Agent, or Firm*—Barnes & Thornburg LLP

(57) ABSTRACT

A MALDI mass spectrometer directs a laser shot onto a MALDI sample to generate a sample spectrum which is analyzed to determine if the sample spectrum meets a predetermined criteria. If so, subsequent laser shots are directed to predetermined locations on the MALDI sample. In essence, if the analysis of a previous laser shot indicates that a "sweet spot" of the MALDI sample has be located, subsequent laser shots may be directed to areas proximate to the previous shot thereby allowing the sweet spot to be thoroughly sampled. A method of operating a MALDI mass spectrometer is also disclosed.

18 Claims, 10 Drawing Sheets

METHOD AND APPARATUS FOR CONTROLLING POSITION OF A LASER OF A MALDI MASS SPECTROMETER

This application claims priority under 35 U.S.C. §119(e) to U.S. Provisional Patent Application Ser. No. 60/455,505 entitled "Method and Apparatus for Controlling Position of a Laser of a MALDI Mass Spectrometer" which was filed on Mar. 17, 2003 by J. Reilly et al., and U.S. Provisional Patent Application Ser. No. 60/455,714, entitled "MALDI Mass Spectrometer Having a Laser Steering Assembly and Method of Operating the Same" which was filed on Mar. 17, 2003 by J. Reilly et al., both of which are expressly incorporated by reference herein.

CROSS REFERENCE

Cross reference is made to copending U.S. patent application Ser. No. 10/603,526 entitled "MALDI Mass Spectrometer Having a Laser Steering Assembly and Method of Operating the Same" by J. Reilly et al. which is assigned to the same assignee as the present application, is filed concurrently herewith, and is hereby incorporated by reference.

FIELD OF THE DISCLOSURE

The present disclosure relates generally to MALDI mass spectrometers and methods of operating the same.

BACKGROUND

A mass spectrometer is an instrument that measures the charge-to-mass ratio of charged particles. Mass spectrometers are in widespread use in biochemistry laboratories to determine molecular weights of biomolecules, monitor bioreactions, detect post-translational modifications, perform protein and oligonucleotide sequencing, along with numerous other applications. One type of mass spectrometer, a matrix-assisted laser desorption ionization (MALDI) mass spectrometer, is particularly well suited for the mass spectrometric analysis and investigation of large molecules.

MALDI mass spectrometers utilize a method that allows for the vaporization and ionization of non-volatile biological samples from a solid-state phase directly into the gas phase. To do so, a sample (the "analyte") is suspended or dissolved in a "matrix." A matrix is a compound or ligand that may be co-crystallized with the analyte. It is reported that the presence of the matrix prevents the analyte from being degraded thereby allowing for the detection of intact molecules as large as 1 million Da.

A MALDI sample, typically in the form of a 2 mm or smaller diameter spot, is prepared by depositing a droplet of solution containing a solvent, the analyte, and the matrix on a flat surface and then permitting the droplet to dry. As this occurs, the matrix and the analyte co-crystallize on the surface. At times, the crystals that form are finely graduated and uniform in appearance, while at other times (depending on the matrix) the crystals may be irregular with visible crystalline "spears."

During a MALDI experiment, a laser is focused on the MALDI sample spot. The laser functions as both the desorption and ionization source. In particular, the laser energy is absorbed by the matrix resulting in a microscopic explosion that creates a rapidly expanding matrix plume which carries both analyte and matrix into a vacuum where it is accelerated by an electric field and then transferred to a detector. The matrix also serves as a source of protons that facilitate the ionization of the analyte. The matrix molecules absorb most of the incident laser energy thereby reducing sample damage and ion fragmentation (i.e., soft ionization). Nitrogen lasers operating at prescribed wavelengths (e.g., a wavelength that is well absorbed by most UV matrices) are the most common illumination sources because they are inexpensive and offer a desired combination of power/wavelength/pulsewidth. However, other UV and even IR pulsed lasers have been used with properly selected matrices.

Once the analyte molecules are vaporized and ionized they are electrostatically transferred into a time-of-flight mass spectrometer (TOF-MS) where they are separated from the matrix ions and individually detected, based on their mass-to-charge (m/z) ratios, and thereafter analyzed. High transmission and sensitivity, along with theoretically unlimited mass range are among the inherent advantages of TOF instruments. Separation and detection of the ions at the end of the tube of the TOF instrument is based on their flight time, which is proportional to the square root of their mass-to-charge ratios.

It has been observed that the analyte signal intensity is highly dependent on the location in which the laser is focused on the MALDI sample spot. Certain regions of the MALDI sample spot produce strong analyte signals. Such regions are often referred to as "sweet spots." In these sweet spot regions, the respective amounts of analyte and matrix are by chance proportioned to produce a strong, desirable signal. Moving the focus of the laser by a very small distance away from a sweet spot may significantly change the level of the observed analyte signal intensity. Note also that "sweet spots" are not necessarily long lived. Indeed, sample is released from the surface with every laser firing. As a result, "sweet spots" have a limited, unpredictable lifetime.

In typical experiments, the operator manually or remotely moves the sample around beneath the laser beam's focus while at the same time monitoring the signal intensity. When a strong signal is observed, the sample movement is stopped. The laser is then fired repeatedly (e.g., 5 Hz) with the results of each firing averaged to produce the final mass spectrum. The region around a "sweet spot" is often of great interest to the operator as acceptable signal intensity can often be found there. The sample throughput of such an operator-dependent technique is undesirably limited by sample handling requirements and the physical boundaries of operator speed. As such, the speed of sequentially interrogating MALDI sample spots has been limited by the natural limits of human reaction time. Indeed, it has been observed, for example, that an operator can manually trigger the laser, observe the results, determine whether the next spectrum should be acquired at the same target or a different target, move the sample spot (if necessary), and re-trigger the laser no faster than approximately once per second.

SUMMARY

According to one aspect of the present disclosure, there is provided a MALDI mass spectrometer having a laser steering assembly. The laser steering assembly is operable to steer or otherwise direct movement of a laser focus over the MALDI sample being tested.

Such a laser steering assembly may include a mirror array having a pair of independently controlled mirrors. The first of such a pair of mirrors is operable to move the laser focus along the X-axis of the MALDI sample, whereas the second of such a pair of mirrors is operable to move the laser focus along the Y-axis of the MALDI sample.

The mirror array may be operated to move the laser focus across the MALDI sample to perform a survey scan of the sample. Such a survey scan may be performed by moving the laser focus across the MALDI sample in a predetermined pattern (e.g., in a logarithmic spiral, rectangular raster, Lissajous, etcetera).

A method of operating a MALDI mass spectrometer is also disclosed. The method includes the step of operating a laser steering assembly to move a laser focus across a MALDI sample. The method may include operating the laser steering assembly to move the laser focus to survey scan the MALDI sample.

The laser steering assembly may include a mirror array having a pair of independently controlled mirrors. The first of such a pair of mirrors is operable to move the laser focus along the X-axis of the MALDI sample, whereas the second of such a pair of mirrors is operable to move the laser focus along the Y-axis of the MALDI sample. In such a case, the method may include operating the first mirror and the second mirror to move the laser focus across the MALDI sample to a number of desired locations and/or in a number of desired patterns.

According to another aspect of the present disclosure, there is provided a method of operating a MALDI mass spectrometer. The method includes directing a laser shot onto a MALDI sample to generate a sample spectrum. The sample spectrum is then analyzed to determine if the sample spectrum meets a predetermined criteria. If so, subsequent laser shots are directed to predetermined locations on the MALDI sample. In essence, if the analysis of a previous laser shot indicates that a "sweet spot" of the MALDI sample has been located, subsequent laser shots may be directed to areas proximate to the previous shot thereby allowing the sweet spot to be thoroughly sampled.

An analog integrator may be used to sum a sample spectrum to determine if the spectrum is associated with a sweet spot of the MALDI sample. The sample spectrum may alternatively be evaluated digitally by determining if any of the peak heights of the sample spectrum exceed a predetermined threshold.

Upon detection of a point associated with a sweet spot, the area surrounding the point may be sampled immediately by subsequent laser shots. Alternatively, the coordinates of the detected point may be stored in an electronic record and the initial survey scan completed. Thereafter, the area surrounding each of the points in the electronic record may be subsequently scanned.

A MALDI mass spectrometer configured to perform such a method is also disclosed.

The above and other features of the present disclosure will become apparent from the following description and the attached drawings.

BRIEF DESCRIPTION OF THE DRAWINGS

The detailed description particularly refers to the accompanying figures in which.

DETAILED DESCRIPTION OF THE DRAWINGS

Figure 1:
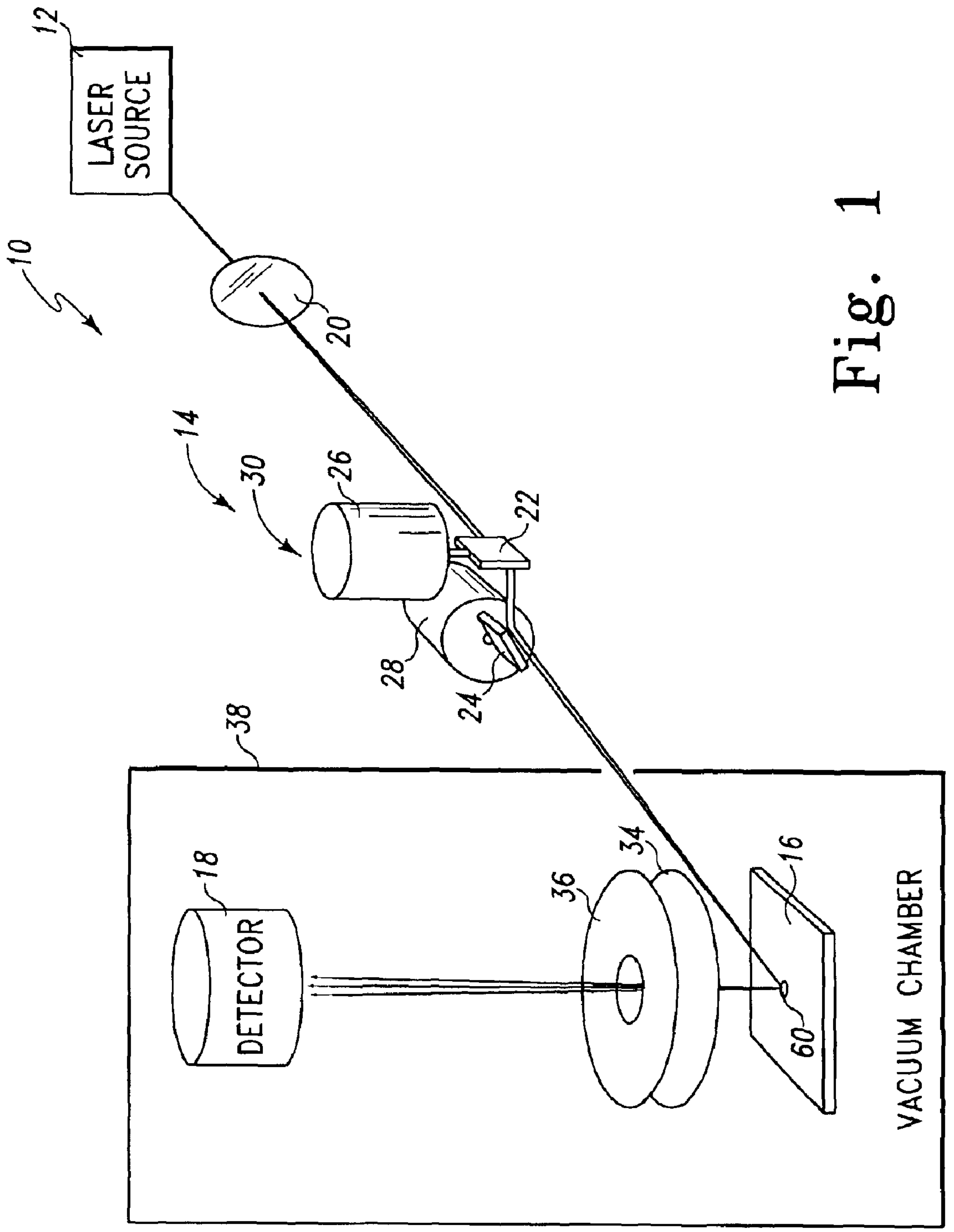
FIG. 1 is a diagrammatic view of a MALDI mass spectrometer.
Figure 2:
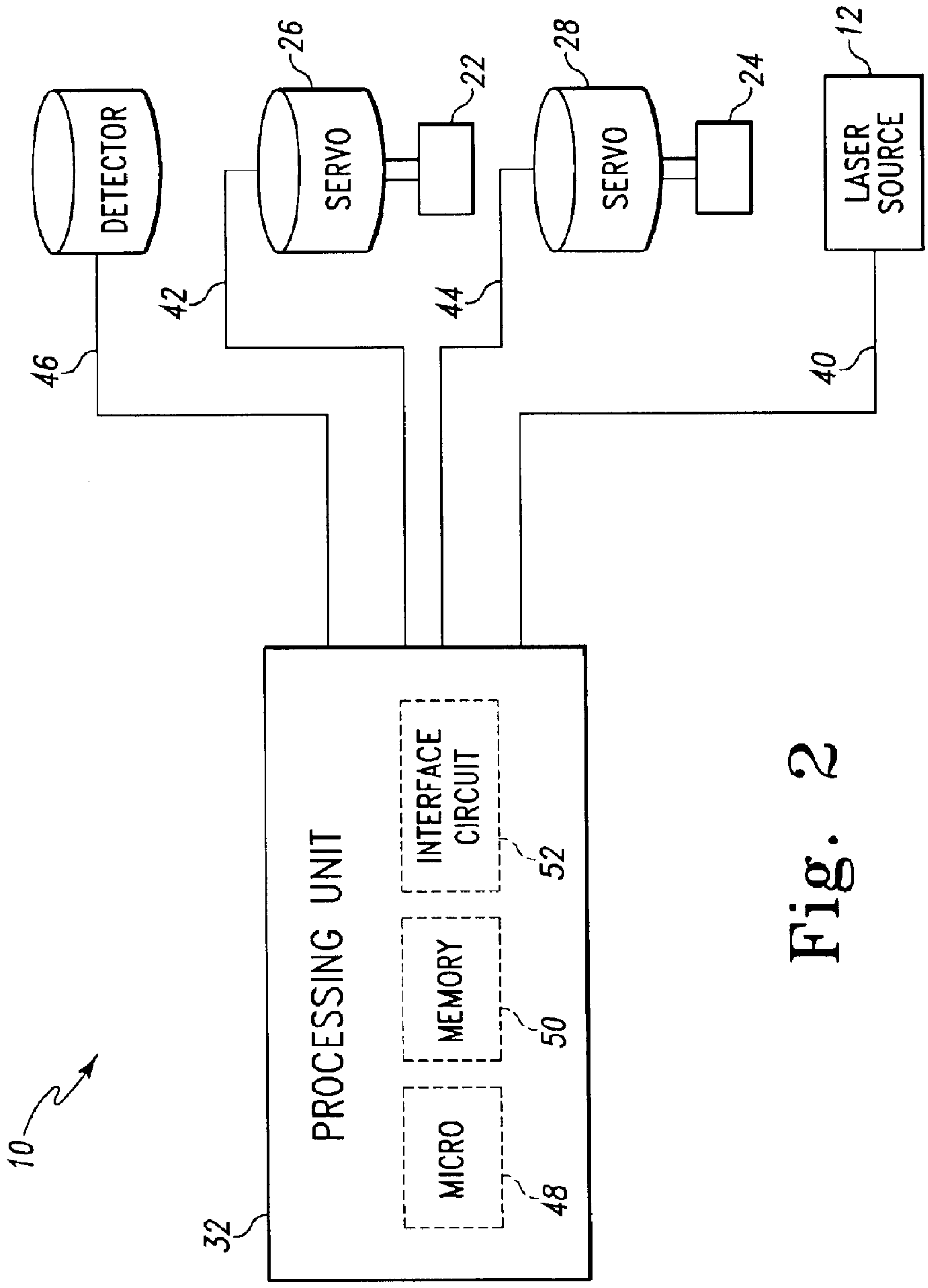
FIG. 2 is a simplified block diagram of the MALDI mass spectrometer of FIG. 1.

Referring now to FIGS. 1 and 2, there is shown a MALDI mass spectrometer 10 having a laser source 12, a laser steering assembly 14, a sample stage 16, and a detector 18. As will be described in greater detail herein, a MALDI sample 60 positioned on the sample stage 16 may be scanned or otherwise sampled with a laser beam, the focus of which is steered or otherwise directed by the laser steering assembly 14.

The laser source 12 may be embodied as any type of laser operating at a desired wavelength for use with a desired matrix or type of matrices. In one exemplary embodiment, the laser source 12 is embodied as an Nd:YLF solid state laser, pulsed at 1000 Hz, and operating at 351 nm. It should be appreciated that other types of lasers, operating frequencies, and/or wavelengths may be utilized to fit the needs of a given spectrometer design. As shown in FIG. 1, the laser beam generated by the laser source 12 is focused by a lens 20 having a focal length on the order of the distance to the sample stage 16. As such, the laser beam is focused to a very small (e.g., 10 to 100 microns) laser spot (hereinafter the "laser focus") at the sample stage 16. Note that although shown upstream of the laser steering assembly 14 in FIG. 1, the lens 20 may alternatively be positioned downstream of the laser steering assembly.

The laser steering assembly 14 may be embodied as any type of assembly or device for moving the laser focus of the laser beam generated by the laser source relative to the sample stage 16. In particular, unlike conventional MALDI mass spectrometers in which the sample stage is moved relative to a fixed laser, the laser steering assembly 14 is operable to move the laser focus of the laser relative to a MALDI sample 60 positioned on the sample stage 16. Such use of the laser steering assembly 14 significantly increases the speed with which MALDI samples 60 can be processed. Specifically, the laser focus can be moved across the MALDI sample at a speed which is orders of magnitude faster than conventional mechanical movement of a sample stage relative to a fixed laser.

In the exemplary embodiment described herein, the laser steering assembly 14 is embodied as a mirror array 30 having a pair of independently addressable mirrors that control position of the laser focus along two perpendicular axes. Specifically, an X-axis mirror 22 of the mirror array 30 controls position of the laser focus along an X-axis of a MALDI sample 60 positioned in the sample stage 16, whereas a Y-axis mirror 24 of the mirror array 30 controls position of the laser focus along a Y-axis of a MALDI sample 60 positioned in the sample stage 16. Each of the steering mirrors 22, 24 has a servo-controlled motor 26, 28, respectively, associated therewith. The servo motors 26, 28 adjust position of the respective steering mirrors 22, 24 based on control signals from a processing unit 32. The servo motors 26, 28 are capable of relatively high bandwidth operation for dynamic changes, with such bandwidths being in the 5 kHz range. By independently controlling the deflection of each steering mirror 22, 24, positioning of the laser focus in any location on a two-dimensional surface (such as a MALDI sample 60 positioned in the sample stage 16) may be accomplished. Moreover, given the high bandwidth operation of the positioning system, rapid changes in the position of the laser focus over time may be achieved.

The steering mirrors 22, 24 are coated for optimal reflection of ultraviolet 351 nm laser light under typical laser fluences. However, other wavelengths (e.g., 1060 nm) may be utilized by substituting appropriately coated mirrors.

The mirror array 30 may be embodied as any type of mirror array configured to perform as described herein. One such commercially available mirror array which may be used as the mirror array 30 of the present disclosure is a model number 6M2003S-Y3 mirror assembly which is commercially available from Cambridge Technology, Incorporated of Cambridge, Mass.

As shown in FIG. 1, the laser focus of the laser beam is steered over the MALDI sample spot 60 located on the sample stage 16 positioned in the mass spectrometer's vacuum chamber 38. As a result, the MALDI sample 60 is ionized and extracted through ion optics 34, 36 that have been configured to collect ions independent of their point of inception. Thereafter, the ions are collected at a detector 18. In a conventional manner, the detector 18 generates output indicative of a mass spectrum of the sample.

As shown in FIG. 1, the laser source 12, mirror array 30, and detector 18 are under the control of the processing unit 32. In particular, the laser source is electrically coupled to the processing unit 32 via a signal line 40, the servo motor 26 associated with the X-axis steering mirror 22 is electrically coupled to the processing unit 32 via a signal line 42, the servo motor 28 associated with the Y-axis steering mirror 24 is electrically coupled to the processing unit 32 via a signal line 44, and the detector 18 is electrically coupled to the processing unit 32 via a signal line 46.

Although the signal lines 40, 42, 44, 46 are shown schematically as a single line, it should be appreciated that the signal lines may be configured as any type of signal carrying assembly which allows for the transmission of electrical signals in either one or both directions between the processing unit 32 and the corresponding component. For example, any one or more of the signal lines 40, 42, 44, 46 may be embodied as a wiring harness having a number of signal lines which transmit electrical signals between the processing unit 32 and the corresponding component. It should be appreciated that any number of other wiring configurations may also be used. For example, individual signal wires may be used, or a system utilizing a signal multiplexer may be used for the design of any one or more of the signal lines 40, 42, 44, 46. Moreover, the signal lines 40, 42, 44, 46 may be integrated such that a single harness or system is utilized to electrically couple some or all of the components associated with the MALDI mass spectrometer 10 to the processing unit 32. It should also be appreciated that other types of connections, including wireless or optical connections, may also be used.

The processing unit 32 is, in essence, the master computer responsible for interpreting electrical signals sent by sensors associated with the MALDI mass spectrometer 10 (e.g., the detector 18) and for activating electronically-controlled components associated with the MALDI mass spectrometer 10 (e.g., the laser source 12 and the mirror array 30). For example, the processing unit 32 is operable to, amongst many other things, operate the laser source 12 to generate laser shots therewith, operate the mirror array 30 to direct laser shots from the laser source onto specific locations of the MALDI sample, analyze the mass spectra of samples, determine the location of subsequent laser shots based on results from previous shots, operate the mirror array to steer the laser focus in a given pattern across the MALDI sample, etcetera.

To do so, the processing unit 32 includes a number of electronic components commonly associated with electronic units which are utilized in the control of electromechanical systems. For example, the processing unit 32 may include, amongst other components customarily included in such devices, a processor such as a microprocessor 48 and a number of memory devices 50 such as random access memory (RAM) devices, programmable read-only memory device ("PROM") including erasable PROM's (EPROM's or EEPROM's), and the like. The memory devices 50 are configured to store, amongst other things, instructions in the form of, for example, a software routine (or routines) which, when executed by the processor 48, allows the processing unit 32 to control operation of the MALDI mass spectrometer 10. In a conventional manner, the processing unit 32 may also include other devices commonly associated with computing devices such as a data storage device (e.g., a hard drive), a number of input devices (e.g., a mouse and keyboard), and a number of output devices (e.g., a display monitor and an audio output device).

The processing unit 32 also includes one or more interface circuits 52. The interface circuit 52 converts the output signals from the various components associated with the MALDI mass spectrometer (e.g., the detector 18) into a signal which is suitable for presentation to an input of the microprocessor 48. In particular, the interface circuit 52, by use of signal amplifiers and analog-to-digital (A/D) converters (not shown) or the like, amplifies and converts the output signals generated by the detector 18 into a digital signal for use by the microprocessor 48. It should be appreciated that the interface circuit may be embodied as a number of discrete devices, or may be integrated into the microprocessor 48. The interface circuit 52 also converts signals from the microprocessor 48 into an output signal which is suitable for presentation to the electrically-controlled components associated with the MALDI mass spectrometer 10. In particular, the interface circuit 52, by use of a number of digital-to-analog (D/A) converters (not shown) or the like, converts the digital signals generated by the microprocessor 48 into analog signals for use by the electronically-controlled components associated with the MALDI mass spectrometer 10 such as the laser source 12 or the mirror array 30. It should be appreciated that if any one or more of the electronically-controlled components associated with the MALDI mass spectrometer 10 operate on a digital input signal, the interface circuit 52 may be bypassed.

Hence, the processing unit 32 may be operated to control operation of the MALDI mass spectrometer 10. In particular, the processing unit 32 executes a routine including, amongst other things, a closed-loop control scheme in which the processing unit 32 determines the locations of the areas or regions of the MALDI sample that produced strong analyte signals (i.e., "sweet spots"). In these sweet spot regions, the respective amounts of analyte and matrix are by chance proportioned to produce a strong, desirable signal. As will be described herein in greater detail, the output from the detector 18 is analyzed and stored by the processing unit 32 in an effort to evaluate the signal quality generated by the previous laser shot. The position of the laser steering mirror array 30 is then updated with a new position, and the laser source 12 is re-triggered to generate another mass spectrum (i.e., collect another packet of ions at the detector 18). By analyzing and feeding the signal quality from the data acquisition system back to the laser steering optics through the processing unit 32, decisions may be made about the relationship of spatial position on a MALDI sample 60 to the signal quality on the sample on a very rapid timescale.

The use of the laser steering mirror array 30 to control the movement of the laser focus over the MALDI sample spot greatly increases the speed at which such a closed loop routine can be performed. In particular, the use of the steering mirror array 30 allows for each of, for example, the 1000 laser shots that contribute to an averaged spectrum, to come from different, non-overlapping regions of the MALDI sample 60. However, not all of the 1000 shots will contribute constructively to the averaged spectrum. Only those laser shots directed onto sweet spots will contribute analyte signal to the averaged spectrum. Those shots not associated with sweet spots will contain predominantly noise and will do little to nothing to improve the appearance of analyte signal in the final averaged spectrum.

Figure 3:
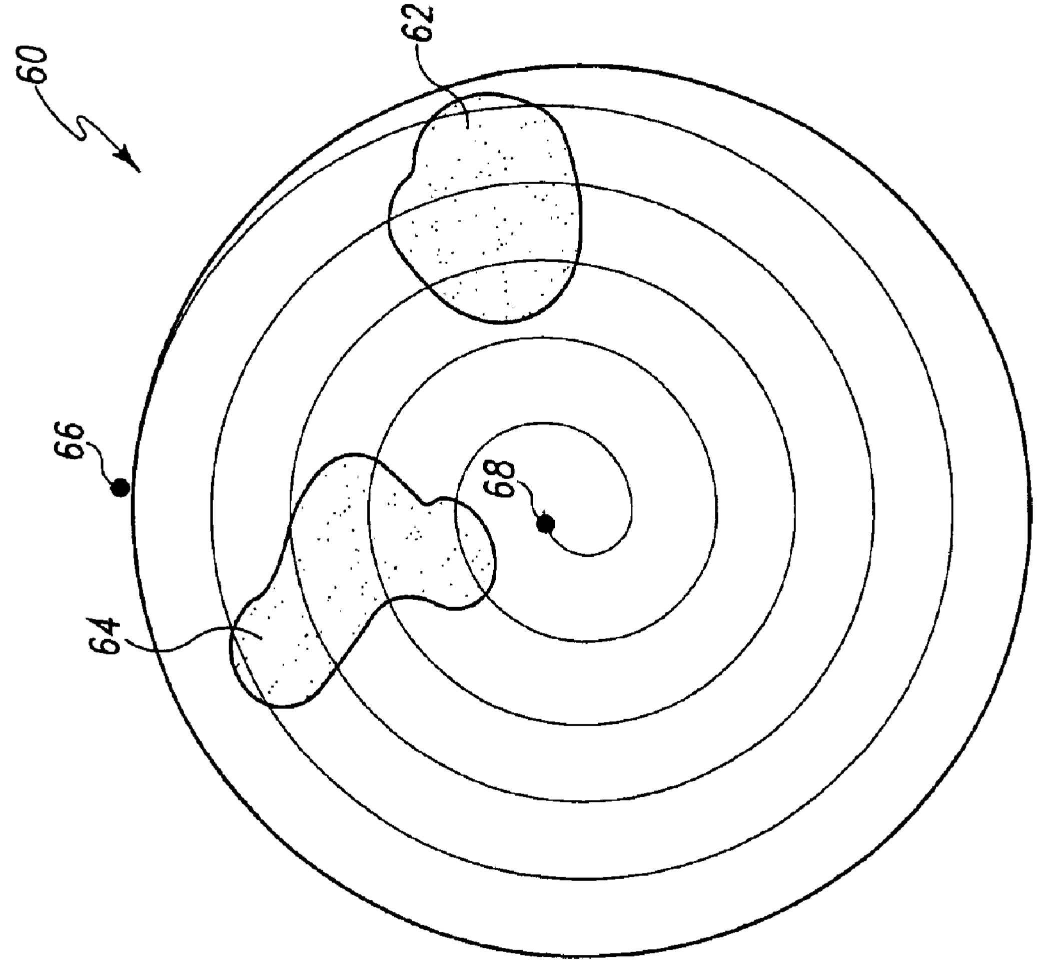
FIG. 3 is a diagrammatic plan view showing an exemplary logarithmic spiral pattern used to survey scan a MALDI sample.

Hence, the processing unit 32 executes a routine to determine the locations of the sweet spots within a given MALDI sample 60 on a millisecond time scale and then uses such information to acquire the MALDI mass spectrum. One exemplary method for doing so includes the execution of a survey scan of the MALDI sample 60 to determine the location of the sweet spots. Such a survey scan may be performed in any scanning pattern or even in a random fashion. In a specific exemplary embodiment, the survey scan is performed in a logarithmic (or some other geometric function) pattern. For example, as shown in FIG. 3, a search pattern embodied as a logarithmic spiral may be employed to analyze the MALDI sample 60. Amongst other things, such a search pattern offers advantages in terms of bandwidth. In particular, since each axis is reproducing a damped sine wave of a fixed bandwidth, rapid starts and stops are not required. In contrast, "rasterizing" a sample requires higher bandwidths to produce the rapid starts and stops at the edges of a trace and retrace procedure.

As shown in FIG. 3, a logarithmic spiral survey scan of the MALDI sample 60 may be used to determine the characteristics of a pair of regions 62, 64 of the sample 60. Specifically, a survey scan may be utilized to determine if either of the regions 62, 64 are sweet spots. If so, additional sampling of the sweet spot may be performed. For instance, if it is determined that the region 62 produces no signal (i.e., the samples from the region 62 appear to only include noise), and that the region 64 produces a strong signal (i.e., the samples from the region 64 appear to have analyte signals), then the processing unit 32 concludes that the region 64 is a sweet spot and the coordinates of the region 64 are stored in an electronic record (e.g., an electronic map of the MALDI spot). At this point, having deemed the region 64 to be a sweet spot, the region 64 may be further analyzed either by an additional, smaller logarithmic spiral (or some other geometric pattern) within the region 64, by direct point-to-point changes in X—Y coordinates (e.g., by moving the laser focus a predetermined distance in one or more predetermined directions). Alternatively, the initial survey scan of the MALDI sample 60 using a logarithmic spiral may be completed prior to further analysis of the region 64 since the X- and Y-coordinates of the region 64 (along with any other discovered sweet spots) are stored in the electronic record.

Moreover, by knowing that the region 62 contains little or even no useful signal, no further analysis time is wasted searching for usable signal within this region. This feedback eliminates a considerable problem in heretofore designed MALDI mass spectrometers, namely the time spent searching for a good signal in a MALDI sample of interest.

The characteristics of the logarithmic spiral pattern may be configured to fit the needs of a given design. For example, the logarithmic spiral pattern may be designed to spiral inwardly from a point 66 on the outside of the MALDI sample 60. In such a way, the laser focus "rests" on a point outside of the MALDI sample 60 (i.e., the point 66) thereby preventing unnecessary ablation of the sample. Moreover, the number of spiral loops (both inwardly and outwardly) may be varied to, for example, balance scanning precision with sample throughput. In one exemplary embodiment, the logarithmic spiral is configured to perform five (5) loops during inward movement of the laser focus from the outer point 66 to the center point 68 of the MALDI sample, and then perform a single loop outwardly from the center point 68 back to the outer point 66. Moreover, the time utilized to perform such a spiral survey scan may also be configured to fit the needs of a given design. For example, the spiral survey scan may be performed in less than a second. Yet further, the angular velocity of the spiral search pattern may be increased during the inward spiral. In other words, the speed at which the laser focus spirals across the sample may be increased as the laser focus spirals inwardly from the outer point 66 to the center point 68.

As described above, the results of a previous laser shot are analyzed to determine the location on the MALDI sample of a subsequent laser shot or shots. To do so, a predetermined criteria may be established with the results of the previous laser shot (e.g., the mass spectrum of the sample) being compared to such a criteria. The criteria may take on many different forms and may be customized to fit the needs of a given system. Various criteria may be established to balance, for example, precision of decision making, sample throughput speed, etcetera.

Figure 4:
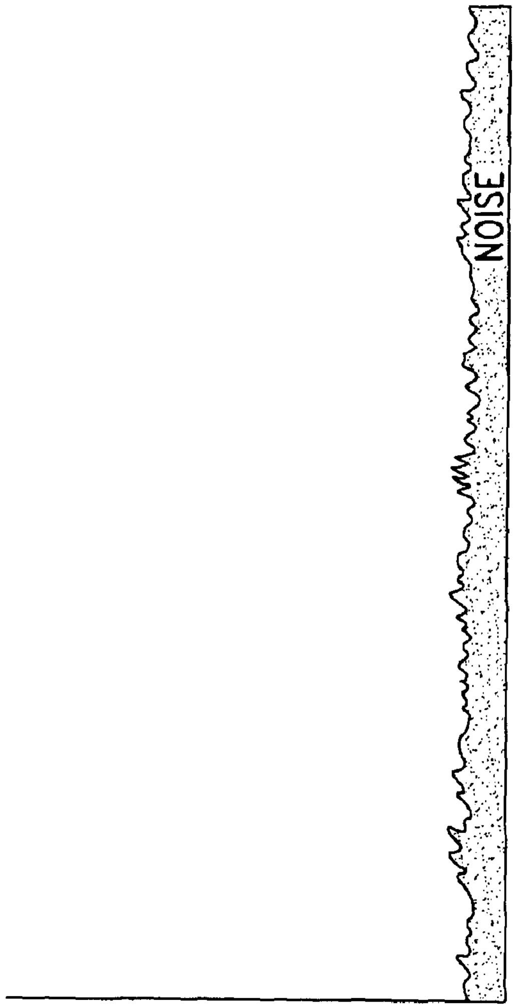
FIGS. 4–7 are graphs showing sample spectra being analyzed by use of an analog integrator to sum the signal intensity of the spectra.
Figure 5:
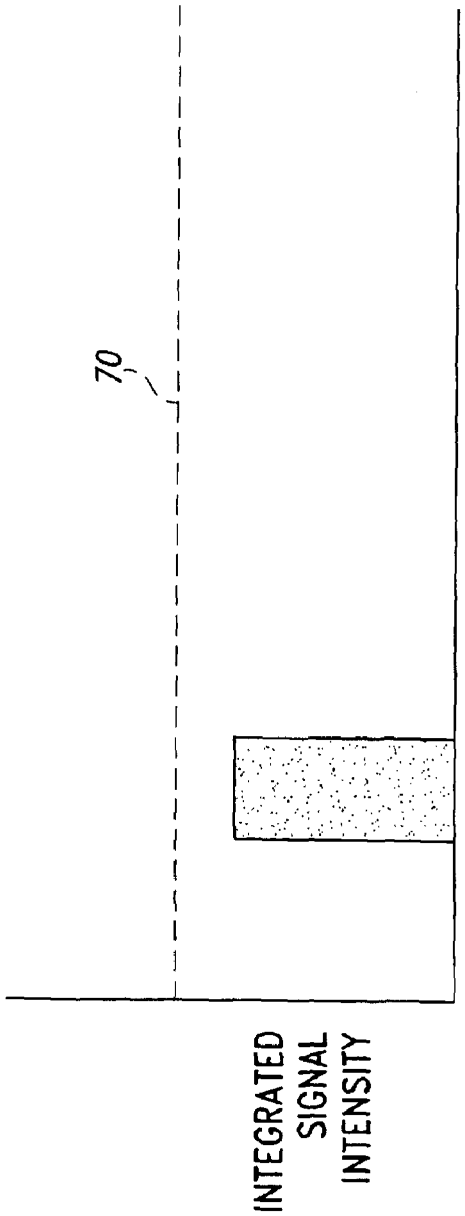
Figure 6:
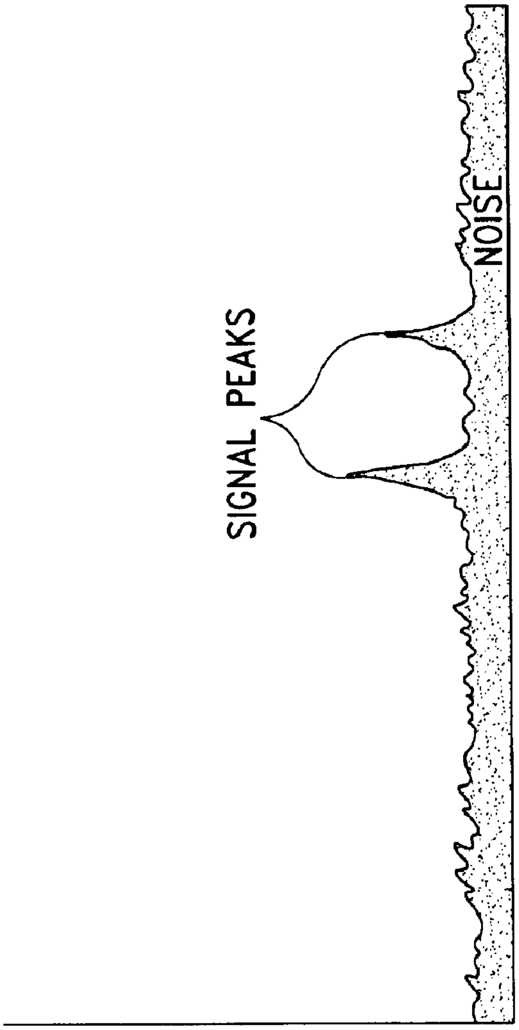
Figure 7:
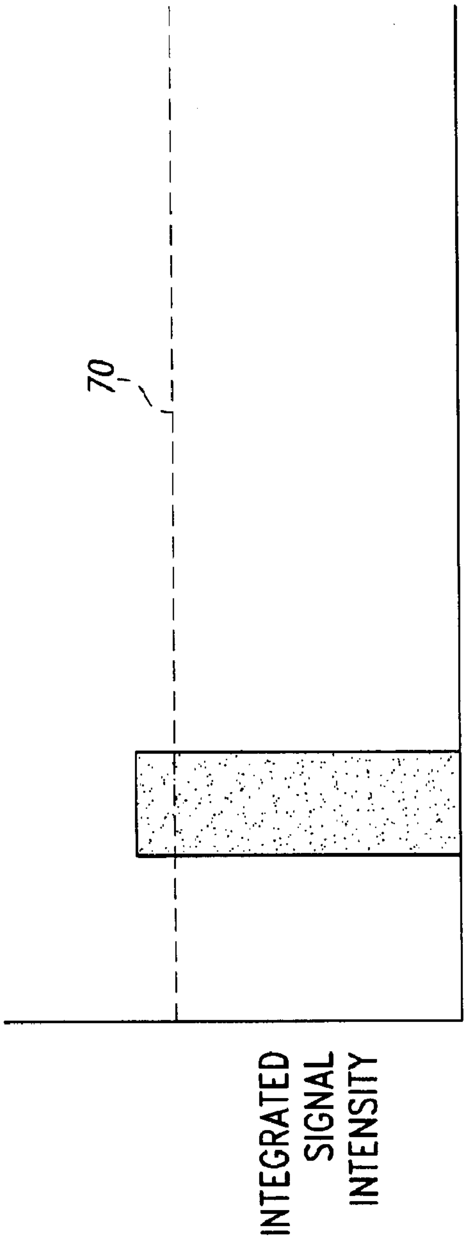
Figure 8:
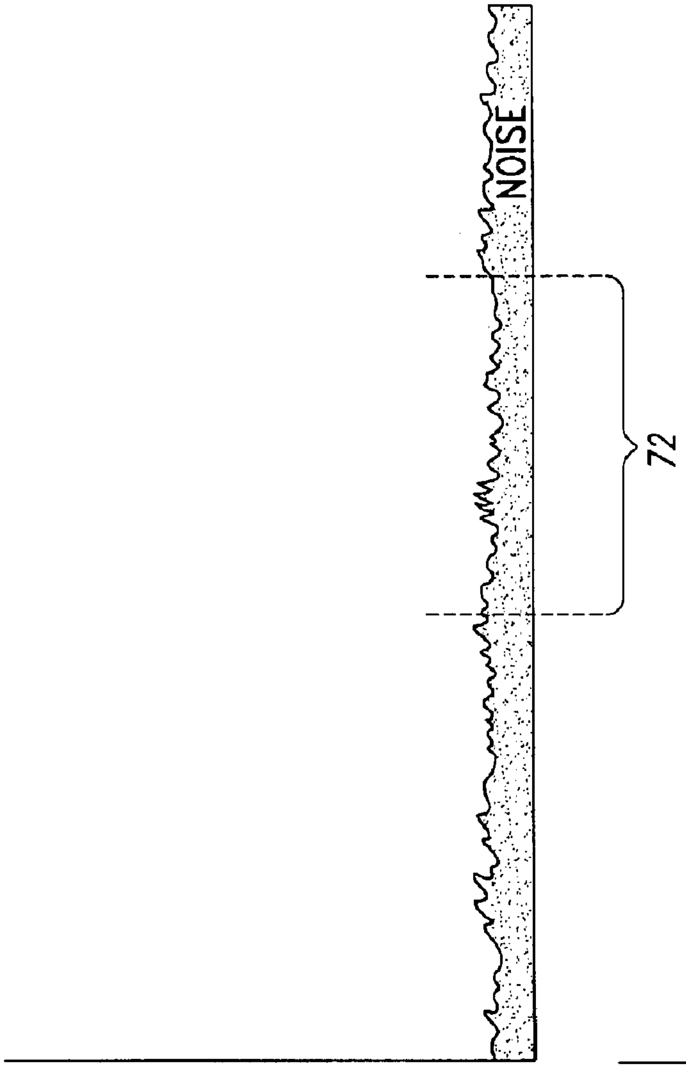
FIGS. 8–11 are graphs showing a portion or "window" of the sample spectra being analyzed by use of an analog integrator to sum the signal intensity of the portion of the sample spectra within the window.

One exemplary manner of analyzing the results of previous laser shots is shown in FIGS. 4–7. In this case, an analog integrator is utilized to sum the signal intensity of the entire sample spectrum. For example, the sample spectra of FIGS. 4 and 6 may be represented as integrated signal intensities as shown in FIGS. 5 and 7, respectively. From one shot to the next, random noise contributes approximately the same amount to the integrated (i.e., summed) signal intensity (as shown in FIGS. 4 and 5). However, the presence of an analyte signal in the sample spectrum increases the integrated signal intensity (as shown in FIGS. 6 and 7). Hence, a predetermined threshold (designated with a dashed line 70 in FIGS. 5 and 7) may be established and used to determine when the integrated signal intensity includes an analyte signal. In particular, once the signal intensity has been integrated (i.e., summed), the resultant integrated value may be compared to the predetermined threshold 70 to determine if the integrated value exceeds the threshold. If the integrated value exceeds the predetermined threshold 70 (as shown in FIG. 7), it may be concluded that the previous laser shot includes an analyte signal (i.e., the previous shot was directed onto a sweet spot of the MALDI sample). If the integrated value is below the predetermined threshold 70 (as shown in FIG. 5), it may be concluded that the previous laser shot does not include an analyte signal (i.e., the previous shot was not directed onto a sweet spot of the MALDI sample).

Figure 9:
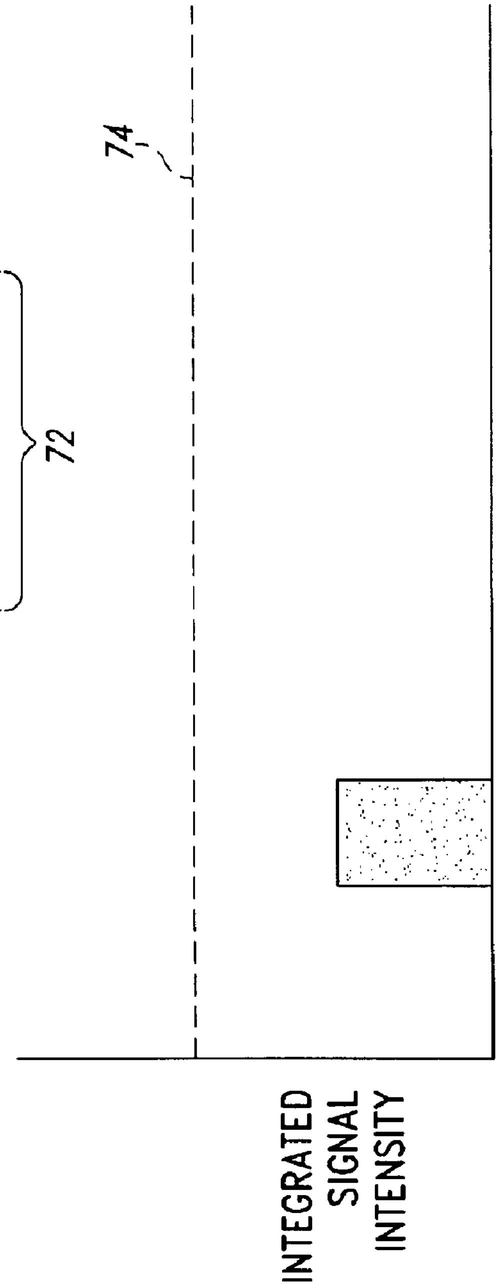
Figure 10:
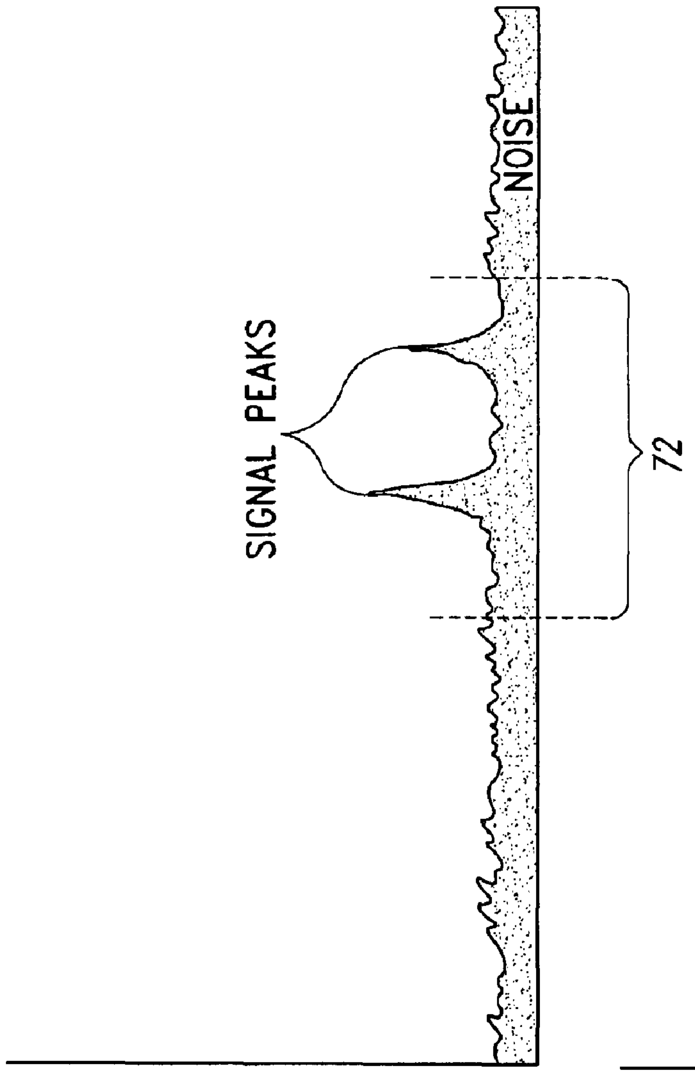
Figure 11:
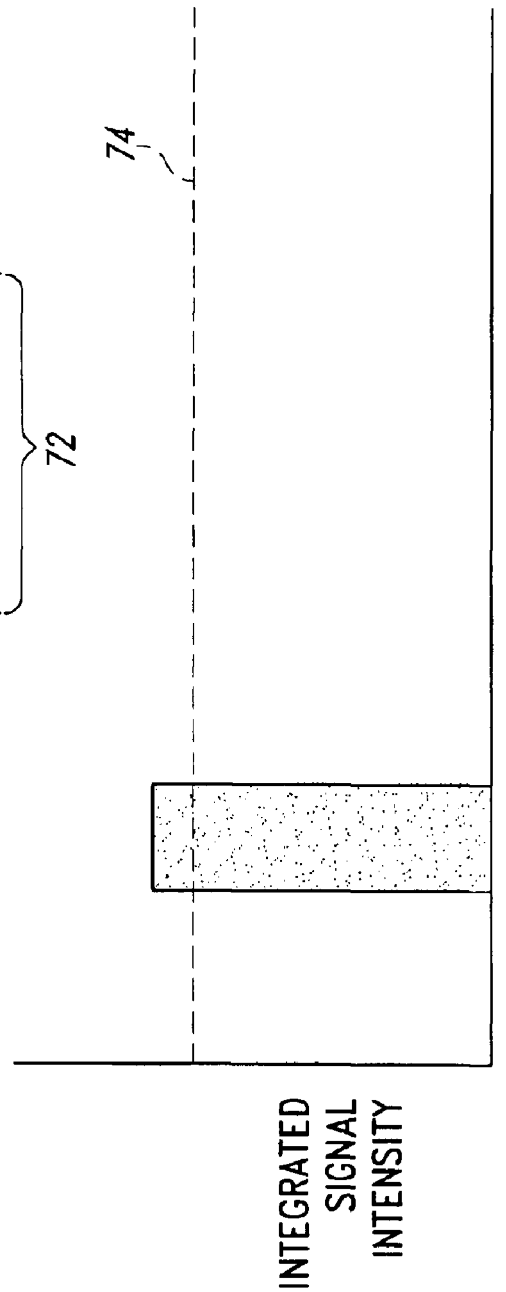

An exemplary variation of the analysis technique described in FIGS. 4–7 is shown in FIGS. 8–11. In this case, the analog integrator is utilized to integrate only a portion or "window" 72 of the mass spectrum of the previous laser shot. For example, the windows 72 of the sample spectra of FIGS. 8 and 10 may be represented as integrated signal intensities as shown in FIGS. 9 and 11, respectively. The location and width of the window 72 may be selected to include those portions of the sample spectrum which are known to contain analyte signal intensities (i.e., peaks). In such a way, the contribution of noise to the integrated signal is reduced. As a result, the analyte signal contributes a relatively greater amount to the integrated signal intensity. As with the technique described above in regard to FIGS. 4–7, a predetermined threshold (designated with a dashed line 74 in FIGS. 9 and 11) may be established and used to determine when the integrated signal intensity generated from the window 72 of the sample spectrum includes an analyte signal. If the integrated value exceeds the predetermined threshold 74 (as shown in FIG. 11), it may be concluded that the previous laser shot includes an analyte signal (i.e., the previous shot was directed onto a sweet spot of the MALDI sample). Conversely, if the integrated value is below the predetermined threshold 74 (as shown in FIG. 9), it may be concluded that the previous laser shot does not include an analyte signal (i.e., the previous shot was not directed onto a sweet spot of the MALDI sample).

Figure 12:
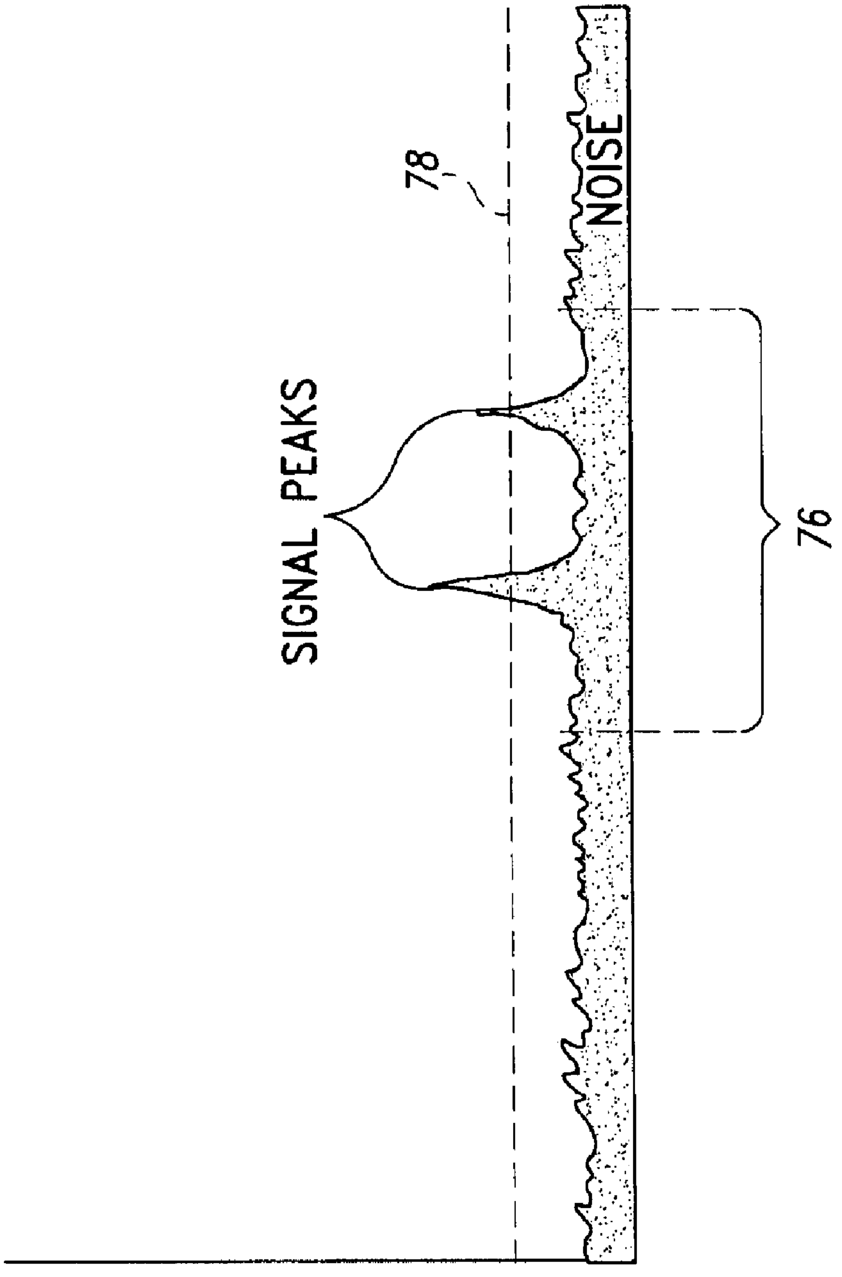
FIG. 12 is a graph of a sample spectrum in which the spectrum is digitally evaluated.

As shown in FIG. 12, the mass spectrum of a given laser shot may also be evaluated digitally. In this case, one or more windows 76 of the spectrum which are known to contain analyte signal intensities (i.e., peaks) are evaluated. Peak finding computer algorithms are used to separate analyte signal peaks from background noise in the spectrum. Once identified, the heights of the detected signal peaks are then compared to a predetermined threshold (designated with a dashed line 78 in FIG. 12). If the peak height exceeds the predetermined threshold 78, it may be concluded that the previous laser shot includes an analyte signal (i.e., the previous shot was directed onto a sweet spot of the MALDI sample). Conversely, if the peak height is below the predetermined threshold 78, it may be concluded that the previous laser shot does not include an analyte signal (i.e., the previous shot was not directed onto a sweet spot of the MALDI sample).

Figure 13:
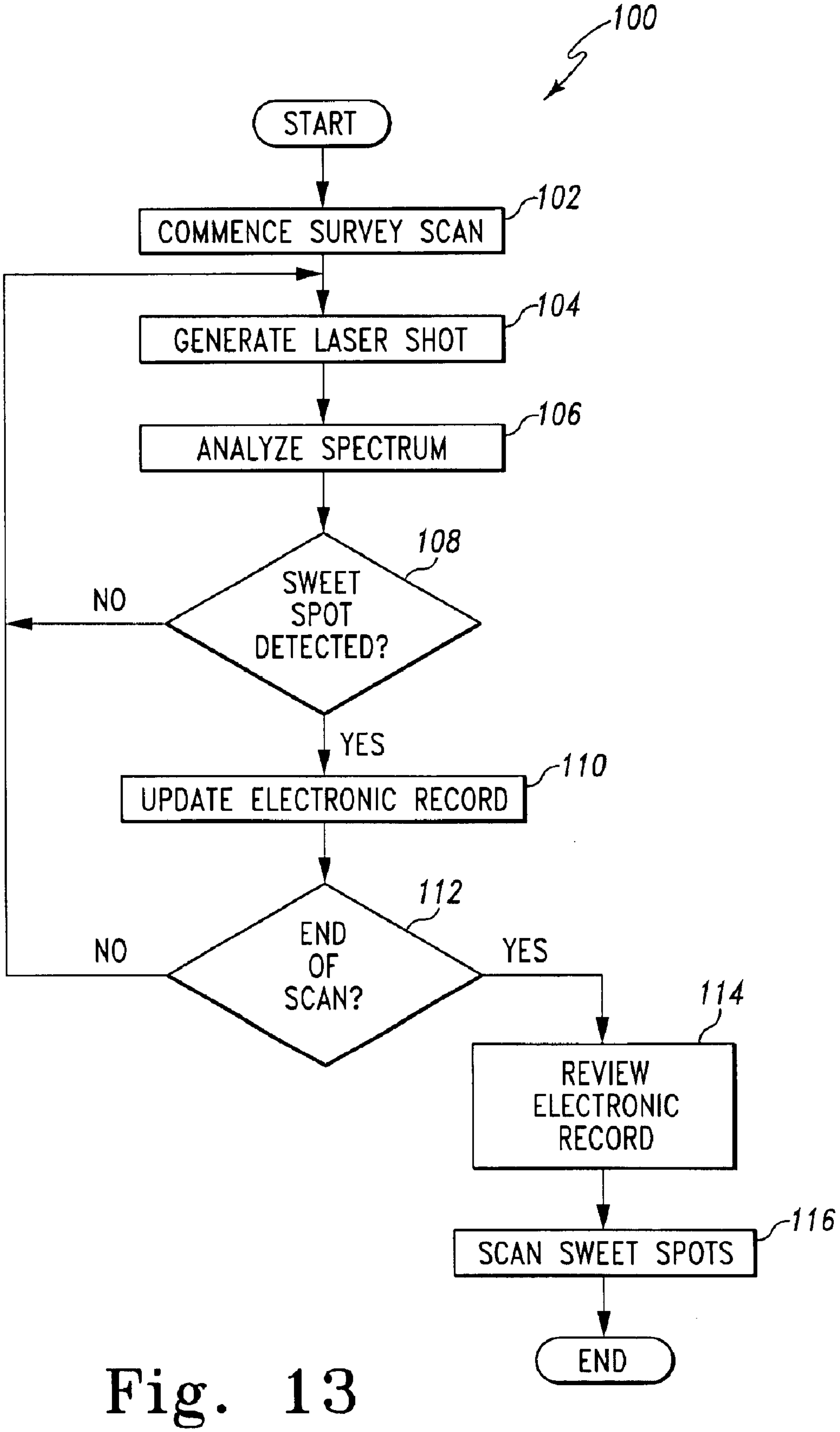
FIG. 13 is a flowchart of an exemplary control routine for scanning a MALDI sample.

Referring now to FIG. 13, there is shown a flowchart of a control routine 100 executed by the processing unit 32 during operation of the MALDI mass spectrometer 10 to sample a given MALDI sample 60. The control routine 100 commences with step 102 in which a survey scan of the MALDI sample 60 is commenced. Specifically, the MALDI sample 60 is positioned in the sample stage 16 and the stage 16 is thereafter queued for sampling.

In step 104, a laser shot is generated as part of the survey scan. Specifically, the processing unit 32 generates an output signal on the signal line 40 thereby causing the laser source 12 to generate a laser shot which is directed to a predetermined location on the MALDI sample 60 positioned on the sample stage 16. As described above, such a laser shot (and subsequent shots) may be performed as part of a pattern. In particular, the laser shot (and subsequent shots) may be directed across the MALDI sample 60 in a logarithmic spiral pattern (or some other geometric pattern) as described herein in regard to FIG. 3.

In step 106, the mass spectrum generated as a result of the laser shot in step 104 is analyzed. As described herein, the mass spectrum of a given laser shot may be analyzed in a number of different manners. For example, as described in regard to FIGS. 4–7, an analog integrator may be utilized to sum the entire mass spectrum with the result thereof then compared to a predetermined threshold. Alternatively, as described herein in regard to FIGS. 8–11, an analog integrator may be utilized to sum only a window of the spectrum with the result thereof being compared to a predetermined threshold. Yet further, in step 106 the mass spectrum may be evaluated digitally such as by the technique described herein in regard to FIG. 12. It should be appreciated that other analysis techniques may be utilized in step 106 to fit the needs of a given design.

The routine 100 then advances to step 108 where the processing unit 32 determines if a sweet spot was detected. Specifically, the processing unit 32 determines if the laser shot generated in step 104 was directed onto a sweet spot of the MALDI sample 60. In particular, as described herein in regard to FIGS. 4–12, predetermined thresholds may be established to determine if the sample spectrum generated and analyzed in response to the previous laser shot (i.e., the laser shot generated in step 104) is indicative of a sample spectrum containing an analyte signal. If the sample spectrum includes an analyte signal, the processing unit 32 determines that the previous laser shot was directed onto a sweet spot of the MALDI sample 60. As such, in step 108, if a sweet spot is detected (i.e., the shot generated in step 104 was directed onto a sweet spot), a control signal is generated and the control routine advances to step 110. If a sweet spot is not detected in step 108, the control routine loops back to step 104 to continue the survey scan by generating additional laser shots.

In step 110, the processing unit 32 adds a record of the sweet spot detected in step 108 to an electronic record maintained in the memory device 50. In particular, the processing unit 32 generates an output signal which causes an electronic record maintained in the memory device 50 to be updated to include a record of the X- and Y-coordinates of the MALDI sample 60 at which the previous laser shot (i.e., the laser shot generated in step 104) was directed. As discussed above, it should be appreciated that the electronic record maintained in the memory device 50 may embodied in the form of an electronic map of the MALDI sample 60. In such a case, the location of any detected sweet spots are recorded on the map. Once a record of the sweet spot has been entered into the electronic record, the routine 100 advances to step 112.

In step 112, the processing unit 32 determines if the survey scan has been completed. Specifically, as described herein in regard to FIG. 3, the survey scan may be embodied as a logarithmic spiral which scans inwardly from an outer point 66 to a center point 68, and then scans outwardly again back to the outer point 66. In this case, if the survey scan has scanned through such a pattern (i.e., the laser focus has been advanced back to the outer point 66 thereby completing the survey scan), the control routine 100 advances to step 114. If the survey scan is not complete, the control routine 100 loops back to step 104 to continue execution of the survey scan in an attempt to locate additional sweet spots. It should be appreciated that if other scanning patterns (or even random patterns) are utilized to perform the survey scan, the processing unit 32 would monitor completion of such a survey scan in a similar manner.

In step 114, the processing unit 32 reviews the electronic record. In particular, the processing unit 32 queries the memory device 50 to retrieve a list of the points identified as being within sweet spots on the MALDI sample 60, along with their associated X- and Y-coordinates. Armed with this information, the control routine advances to step 116.

In step 116, the processing unit 32 scans the sweet spots. In particular, the processing unit 32 generates output signals on the signal lines 40, 42, 44 thereby causing the laser source 12 and the steering mirrors 22, 24 to generate and direct a number of laser shots onto the sweet spots of the MALDI sample 60. Specifically, once the location of a number of points associated with the sweet spots of the sample are known (as retrieved from the electronic record in step 114), a scanning routine may be executed which samples the areas around such points in greater detail in an effort to thoroughly sample the sweet spots. For example, a smaller logarithmic spiral centered around each of the X- and Y- coordinates stored in the electronic record may be performed. Alternatively, scans utilizing point-to-point changes in the X- and Y-coordinates stored electronic record may be performed. In particular, a smaller spiral scan may be centered around a point (or number of points) that is a predetermined distance in one or more predetermined directions away from each of the X- and Y-coordinates stored in the electronic record. It should be appreciated that numerous other scanning techniques may be utilized to sample the points identified as originating from sweet spots during the survey scan with the specific examples described herein being merely exemplary in nature.

Once each of the sweet spots has been scanned in step 116, the plurality of spectra generated during the scanning routine are averaged to produce a final, average mass spectrum of the MALDI sample 60 for use by the operator of the MALDI mass spectrometer 10. The control routine 100 then ends, and the MALDI spectrometer 10 is returned to a standby condition until activated to analyze a subsequent MALDI sample 60.

Figure 14:
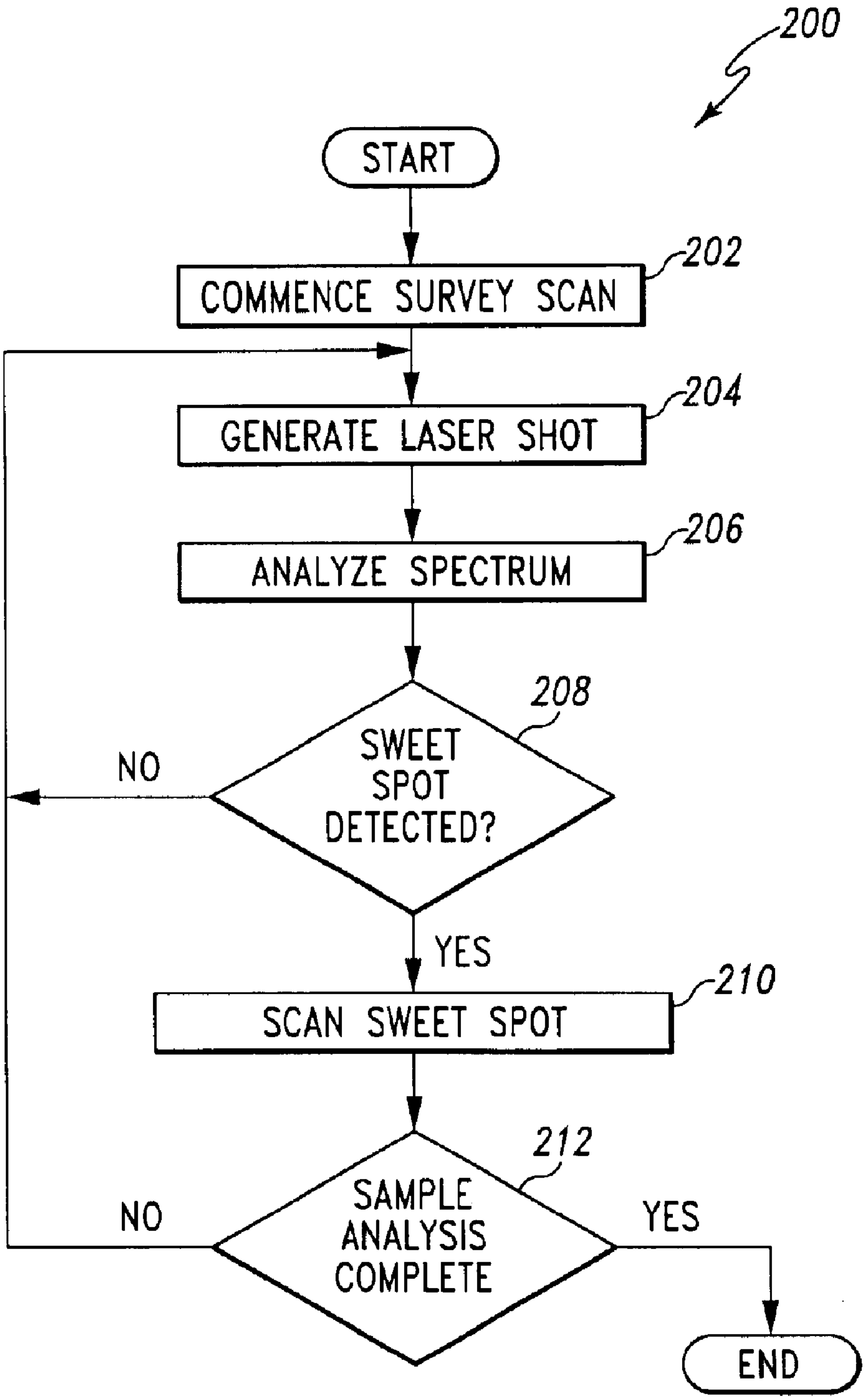
FIG. 14 is a flowchart of another exemplary control routine for scanning a MALDI sample.

Referring now to FIG. 14, there is shown an alternate control routine 200 which may be executed by the processing unit 32 during operation of the MALDI mass spectrometer 10 to sample a given MALDI sample 60. The control routine 200 is somewhat similar to the control routine 100 except that detailed scanning of sweet spots is performed during the survey scan as opposed to at the end of the survey scan. The control routine 200 commences with step 202 in which a survey scan of the MALDI sample 60 is commenced. Specifically, the MALDI sample 60 is positioned in the sample stage 16 and the stage 16 is thereafter queued for sampling.

In step 204, a laser shot is generated as part of the survey scan. Specifically, the processing unit 32 generates an output signal on the signal line 40 thereby causing the laser source 12 to generate a laser shot which is directed to a predetermined location on the MALDI sample 60 positioned on the sample stage 16. As described above, such a laser shot (and subsequent shots) may be performed as part of a pattern. In particular, the laser shot (and subsequent shots) may be directed across the MALDI sample 60 in a logarithmic spiral pattern as described herein in regard to FIG. 3.

In step 206, the mass spectrum generated as a result of the laser shot in step 204 is analyzed. As described herein, the mass spectrum of a given laser shot may be analyzed in a number of different manners. For example, as described in regard to FIGS. 4–7, an analog integrator may be utilized to sum the entire mass spectrum with the result thereof then compared to a predetermined threshold. Alternatively, as described herein in regard to FIGS. 8–11, an analog integrator may be utilized to sum only a window of the spectrum with the result thereof being compared to a predetermined threshold. Yet further, in step 206 the mass spectrum may be evaluated digitally such as by the technique described herein in regard to FIG. 12. It should be appreciated that other analysis techniques may be utilized in step 206 to fit the needs of a given design.

The routine 200 then advances to step 208 where the processing unit 32 determines if a sweet spot was detected. Specifically, the processing unit 32 determines if the laser shot generated in step 204 was directed onto a sweet spot of the MALDI sample 60. In particular, as described herein in regard to FIGS. 4–12, predetermined thresholds may be established to determine if the sample spectrum generated and analyzed in response to the previous laser shot (i.e., the laser shot generated in step 204) is indicative of a sample spectrum containing an analyte signal. If the sample spectrum includes an analyte signal, the processing unit 32 determines that the previous laser shot was directed onto a sweet spot of the MALDI sample 60. As such, in step 208, if a sweet spot is detected (i.e., the shot generated in step 204 was directed onto a sweet spot), a control signal is generated and the control routine advances to step 210. If a sweet spot is not detected in step 208, the control routine loops back to step 204 to continue the survey scan by generating additional laser shots.

In step 210, the processing unit 32 scans the sweet spot detected in step 208. In particular, the processing unit 32 generates output signals on the signal lines 40, 42, 44 thereby causing the laser source 12 and the steering mirrors 22, 24 to generate and direct a number of laser shots onto the MALDI sample 60 in the areas surrounding the point detected in step 208. Specifically, as described above, a scanning routine may be executed which samples the areas around the detected point in greater detail in an effort to thoroughly sample the sweet spot in which the detected point is located. For example, a smaller logarithmic spiral centered around the detected sweet spot point or points may be performed. Alternatively, scans utilizing point-to-point changes in the X- and Y-coordinates may be performed. In particular, a smaller spiral scan may be centered around a point (or number of points) that is a predetermined distance in one or more predetermined directions away from the point of the sweet spot detected in step 208. It should be appreciated that numerous other scanning techniques may be utilized to sample the point identified as a sweet spot with the specific examples described herein being merely exemplary in nature. Once the sweet spot has been scanned in greater detail in step 210, the survey scan is resumed and the control routine 200 advances to step 212.

In step 212, the processing unit 32 determines if the survey scan of the MALDI sample 60 has been completed. Specifically, as described herein in regard to FIG. 3, the survey scan may be embodied as a logarithmic spiral which scans inwardly from an outer point 66 to a center point 68, and then scans outwardly again back to the outer point 66. In this case, if, after the survey scan is resumed, the laser focus has scanned completely through such a pattern (i.e., the laser focus has been advanced back to the outer point 66 thereby completing the survey scan), the plurality of spectra generated during the scanning routine are averaged to produce a final, averaged mass spectrum of the MALDI sample 60 for use by the operator. The control routine 200 then ends, and the MALDI spectrometer 10 is returned to a standby condition until activated to analyze a subsequent MALDI sample 60. However, if the survey scan is not complete, the control routine 200 loops back to step 204 to continue execution of the survey scan in an attempt to locate additional sweet spots. It should be appreciated that if other scanning patterns (or even random patterns) are utilized to perform the survey scan, the processing unit 32 would monitor completion of such a survey scan in a similar manner.

As described herein, the MALDI spectrometer and the methods of operating the same disclosed herein have numerous advantages over heretofore designed MALDI spectrometers. For example, by use of a laser steering assembly (e.g., the mirror array 30) to move the laser focus relative to a stationary sample stage, sampling may be performed several orders of magnitude more quickly than by systems in which the sample is moved relative to a stationary laser focus. Moreover, by determining the position of subsequent laser shots based on feedback from previous shots, the time intensive process of randomly searching for areas having strong analyte signals is reduced, if not completely eliminated.

While the disclosure is susceptible to various modifications and alternative forms, specific exemplary embodiments thereof have been shown by way of example in the drawings and have herein been described in detail. It should be understood, however, that there is no intent to limit the disclosure to the particular forms disclosed, but on the contrary, the intention is to cover all modifications, equivalents, and alternatives falling within the spirit and scope of the invention as defined by the appended claims.

There are a plurality of advantages of the present disclosure arising from the various features of the apparatus and methods described herein. It will be noted that alternative embodiments of the apparatus and methods of the present disclosure may not include all of the features described yet still benefit from at least some of the advantages of such features. Those of ordinary skill in the art may readily devise their own implementations of an apparatus and method that incorporate one or more of the features of the present disclosure and fall within the spirit and scope of the present disclosure.

For example, although the software concepts disclosed herein are described as already being loaded or otherwise maintained on a computing device (e.g., the processing unit 32), it should be appreciated that the present disclosure is intended to cover the software concepts described herein irrespective of the manner in which such software concepts are disseminated. For instance, the software concepts of the present disclosure, in practice, could be disseminated via any one or more types of a recordable data storage medium such as a modulated carrier signal, a magnetic data storage medium, an optical data storage medium, a biological data storage medium, an atomic data storage medium, and/or any other suitable storage medium.

Moreover, it should also be appreciated that although techniques have been disclosed herein for identifying sweet spots and then subsequently scanning such sweet spots, other sampling techniques may also be utilized. For example, in some implementations, a suitable sample signal may be achieved by simply moving the laser focus quickly over the MALDI sample and thereafter averaging all of the generated signals. In such a case, signals from both "sweet spot" regions and "non-sweet spot" regions will be included in the averaged sample.

It should also be appreciated that the concepts of the present disclosure may be utilized in the performance of other forms of MALDI spectroscopy. In atmospheric MALDI experiments, the sample is located outside the mass analyzer at high pressure (even at atmospheric pressure). The sample is positioned just in front of a small pinhole or skimmer that continuously admits a steady stream of gas. When the laser strikes the sample, the ions produced move through the pinhole into a vacuum chamber whose design separates the ions from the rest of the gas before passing the ions on to the mass analyzer. In such an application, the sample is typically undergoing constant movement in order to keep the sample positioned in front of the pinhole leak into the instrument. However, even though the sample is being moved, it may still be advantageous to steer the laser across the sample to help preserve ion signal. Alternatively, other types of MALDI experiments position the sample within the spectrometer (e.g., within an ion trap). When the laser strikes the sample, ions are formed and immediately captured, concentrated, or analyzed. In such applications, the sample is often immovable. Whether movable or fixed in position, this form of mass spectrometry would benefit from the ability to scan the laser across the sample by use of the concepts disclosed herein.

In addition, in lieu of categorizing a specific laser shot as being associated with a sweet spot (or not), a map of the MALDI spot may be constructed where the actual signal level is recorded and associated with a location. In such a way, regions with medium level signal intensity may be identified as the "borders" or "boundaries" of the sweet spots.

What is claimed is:

1. A method of operating a MALDI mass spectrometer, the method comprising the steps of:

directing a first laser shot onto a MALDI sample so as to generate a sample spectrum, analyzing the sample spectrum and generating an output signal if the sample spectrum possesses a predetermined criteria, and determining position of a second laser shot to be directed onto the MALDI sample in response to generation of the output signal.

2. The method of claim 1, wherein the analyzing step comprises:

summing the signal intensity of the sample spectrum, and generating the output signal if the sum of the signal intensity of the sample spectrum exceeds a predetermined threshold.

3. The method of claim 1, wherein the analyzing step comprises:

summing the signal intensity of a predetermined portion of the sample spectrum, and generating the output signal if the sum of the signal intensity of the predetermined portion of the sample spectrum exceeds a predetermined threshold.

4. The method of claim 1, wherein the analyzing step comprises:

determining a number of peak heights of the sample spectrum, and generating the output signal if any of the number of peak heights of the sample spectrum exceed a predetermined threshold.

5. The method of claim 1, wherein the determining step comprises directing the second laser shot onto the MALDI sample at a position which is a predetermined distance away from the position on which the first laser shot was directed onto the MALDI sample.

6. The method of claim 1, wherein the determining step comprises directing the second laser shot onto the MALDI sample at a position which is a predetermined direction away from the position on which the first laser shot was directed onto the MALDI sample.

7. A MALDI mass spectrometer, comprising:

a laser source, and a processing unit electrically coupled to the laser source, the processing unit comprising (i) a processor, and (ii) a memory device electrically coupled to the processor, the memory device having stored therein a plurality of instructions which, when executed by the processor, causes the processor to:

(a) operate the laser source to direct a first laser shot onto a MALDI sample so as to generate a sample spectrum, (b) analyze the sample spectrum and generate an output signal if the sample spectrum possesses a predetermined criteria, and (c) determine position of a second laser shot to be directed onto the MALDI sample in response to generation of the output signal.

8. The MALDI mass spectrometer of claim 7, wherein the plurality of instructions, when executed by the processor, further cause the processor to:

sum the signal intensity of the sample spectrum, and generate the output signal if the sum of the signal intensity of the sample spectrum exceeds a predetermined threshold.

9. The MALDI mass spectrometer of claim 7, wherein the plurality of instructions, when executed by the processor, further cause the processor to:

sum the signal intensity of a predetermined portion of the sample spectrum, and generate the output signal if the sum of the signal intensity of the predetermined portion of the sample spectrum exceeds a predetermined threshold.

10. The MALDI mass spectrometer of claim 7, wherein the plurality of instructions, when executed by the processor, further cause the processor to:

determine a number of peak heights of the sample spectrum, and generate the output signal if any of the number of peak heights of the sample spectrum exceed a predetermined threshold.

11. The MALDI mass spectrometer of claim 7, wherein the plurality of instructions, when executed by the processor, further cause the processor to operate the laser source to direct the second laser shot onto the MALDI sample at a position which is a predetermined distance away from the position on which the first laser shot was directed onto the MALDI sample.

12. The MALDI mass spectrometer of claim 7, wherein the plurality of instructions, when executed by the processor, further cause the processor to operate the laser source to direct the second laser shot onto the MALDI sample at a position which is a predetermined direction away from the position on which the first laser shot was directed onto the MALDI sample.

13. A method of operating a MALDI mass spectrometer, the method comprising the step of:

performing a survey scan of a MALDI sample so as to generate a plurality of sample spectra, analyzing each of the plurality of sample spectra and generating an electronic record indicative of locations on the MALDI sample which correspond to each of the plurality of sample spectra that possesses a predetermined criteria, and directing a laser focus over the MALDI sample based on the electronic record.

14. The method of claim 13, wherein the performing step comprises scanning the MALDI sample in a logarithmic spiral pattern.

15. The method of claim 14, wherein scanning the MALDI sample in the logarithmic spiral pattern comprises operating a mirror array so as to move the laser focus over the MALDI sample in the logarithmic spiral pattern.

16. The method of claim 13, wherein the analyzing step comprises:

summing the signal intensity of each of the plurality of sample spectra, and updating the electronic record if the sum of the signal intensity of any of the plurality of sample spectra exceeds a predetermined threshold.

17. The method of claim 13, wherein the analyzing step comprises:

summing the signal intensity of a predetermined portion of each of the plurality of sample spectra, and updating the electronic record if the sum of the signal intensity of the predetermined portion of any of the plurality of sample spectrum exceeds a predetermined threshold.

18. The method of claim 13, wherein the analyzing step comprises:

determining a number of peak heights of each of the plurality of sample spectra, and updating the electronic record if any of the number of peak heights of any of the plurality of sample spectra exceeds a predetermined threshold.

* * * * *